United States Patent [19]

Ishikawa

[11] Patent Number: 4,803,182

[45] Date of Patent: Feb. 7, 1989

[54] HEAT RESISTANT MATERIALS CONTAINING CERAMIC COMPONENTS

[76] Inventor: Sadanobu Ishikawa, 5-5, Omori Kita 6-chome, Ota-ku, Tokyo, Japan

[21] Appl. No.: 132,556

[22] Filed: Dec. 14, 1987

[51] Int. Cl.$^4$ .................. C04B 12/04; C04B 35/18
[52] U.S. Cl. .................................. 501/94; 501/88; 501/89; 501/90; 501/92; 501/95; 501/97; 501/98; 501/100; 501/105; 501/127; 501/128; 501/129; 501/130; 501/131; 501/133; 106/74; 106/85
[58] Field of Search ............ 501/128, 151, 127, 133, 501/; 106/74, 85

[56] References Cited

U.S. PATENT DOCUMENTS

| | | | |
|---|---|---|---|
| 1,900,211 | 3/1933 | Watson | 106/74 |
| 1,900,212 | 3/1933 | Watson | 106/74 |
| 1,998,935 | 4/1935 | Kuzell et al. | 106/74 |
| 3,047,442 | 7/1962 | Bozzauo | 106/74 |
| 3,483,006 | 12/1969 | Vassilevsky | 106/74 |
| 3,981,950 | 9/1976 | Pletzer et al. | 106/104 |

Primary Examiner—William R. Dixon, Jr.
Assistant Examiner—David M. Brunsman
Attorney, Agent, or Firm—Wenderoth, Lind & Ponack

[57] ABSTRACT

A ceramics-based manufacturing material and a coating material are disclosed, both of which are used in high-temperature structures and applications. The ceramics-based manufacturing material may be used for building structural blocks or members, such as refractory bricks, that require the mechanical strength and thermal resistance when they are exposed to the high temperatures of 1,500° C. or above. Those bricks made of the material disclosed provides the mechanical strength and heat resistance better than the conventional ones. The coating material may be used for forming a thermal resistant layer on metal or other material bases. Both materials have substantially the similar compositions, either of which may have the alternative use, such as the manufacturing material or the coating material. Simply adding an appropriate amount of water to either makes it a coating material. In either case, the requirements for the high temperature resistance and mechanical strength can be satisfied.

18 Claims, 1 Drawing Sheet

HEAT RESISTANT MATERIALS CONTAINING CERAMIC COMPONENTS

BACKGROUND OF THE INVENTION

1. Field of the Invention

The present invention relates generally to the manufacture of refractory materials, and more specifically to the composition of thermally-resistant ceramics-based product and coating materials, both for use in high-temperature structures and other applications, including metallic molds, building blocks, and structural members that are exposed to the high temperatures.

2. Description of the Prior Art

A structural product that is shaped or formed so that it can resist the high temperature when it is exposed in such high temperature environment is known to the prior art. For example, a refractory brick is used for forming the interior walls of the furnace. In this application, the refractory brick becomes more brittle as the ambient temperature is rising to a higher temperature (such as 1,200° C. or more), and tends to break or fuse easily when any external force is applied under the high temperature conditions. Thus, demand arises for other products that can have a mechanical and/or chemical strength sufficient to resist both the high temperature and external forces. Furthermore, there is no means that can effectively protect metal parts from any corrosion that may be produced when they are placed under the high temperature environment, are heated to high temperatures, or are exposed to burning gases. In this case, demand also arises for coating materials that can resist in those situations. In either case, no successful products or materials have been known.

As described, the conventional refractory brick tends to break easily as the ambient temperature rises above 1,200° C. and if any external force is applied, causing severe damage and wear. Other refractories are also known, which tend to have their original shaped altered easily when they are in the fusible state or any external force is applied. Those materials may be used as coating materials, but are not suitable for some particular applications which require mechanical strength and high-temperature resistance, such as furnaces and aerospace craft (such as recoverable capsules in particular). Other refractory products that are used for some special purposes are obtained by the special manufacturing process (such as high-pressure, high-temperature treatment). When the shapes become more complicated, it is difficult to obtain those shapes with high precision. Therefore, those complicated shapes can only be obtained at high cost. Particularly, for those products that require the higher temperature resistance, the manufacturing costs tend to increase remarkably.

Some metal molds allow any particular shapes to be produced by using the high-temperature burning gases. It is known that when the surface temperature of the metal mold rises to between 750° C. and 1,200° C., its metal parts will become oxidized by the heat produced, or corrosion may be caused by the burning gases. However, no effective means is provided for preventing those adverse effects.

Other metal molds are used to press and squeeze a product into a particular shape. During the squeezing process, the temperature rises rapidly to between 150° C. and 1,200° C., which may burn out the metal parts.

A temperature sensor or thermometer that is used for measuring the internal temperatures inside the furnace is enclosed in its protective casing. This protective casing is exposed to the high-temperature heating produced in the furnace, and may become eroded prematurely under those severe conditions. Thus, those protective casings may soon become useless, and must be replaced more frequently or at relatively short-term intervals.

SUMMARY OF THE INVENTION

In the following specification and claims all parts and percentages are by weight unless otherwise specified.

One object of the present invention is to provide a ceramics- and/or metals-based product which comprises a suitable hardening composition and the specific components selected from the ceramics group or metals group or combination thereof from both the groups, as well as water that is added to those compositions. The product may be obtained by forming those compositions into a desired shape and allowing the shape to settle or cure, followed by allowing it to dry and then baking it. Those processes proceed at the particular temperatures that may be varied in a controlled manner.

In one specific form of the present invention, the hardening composition may contain a particular proportion of alunite, powdery sodium silicate, and sodium silicofluoride. The ceramics group includes alumina, sericite, clay, sirasu, silicon carbide, silicon nitride, ceramics fiber, whisker, boron fiber, graphite, and zirconia, and the metals group includes copper, magnesium, titanium, and nickel. In this specific form, the hardening composition may consist of 40%–70% of alunite, 30%–40% of powdery sodium silicate, and about 10% of sodium fluosilicates. This hardening composition may be combined with any components of the ceramics group or metals group, or combination thereof from both the groups, in the proportions of 40%–60% and 60%–40%, for example.

As one feature of the present invention, the combination of the hardening composition and selected ceramic and/or metal components thus obtained may be easily formed into any suitable shape by adding an appropriate amount of water. Then, the shape is allowed to settle or cure for a given period of time. After hardening, the finished product can provide great mechanical strength and heat resistance properties. Another feature of the present invention is in the ability to provide products whose thermal resistance property may adjustably be varied, depending on the nature of the particular ceramics components to be added to the hardening composition.

In another specific form of the present invention, the hardening composition may contain alunite, powdery sodium silicate, and sodium fluosilicate as in the previous form. Then, a single component or combination of components selected from the ceramics group consisting of the components listed above may be added to the hardening composition, to which an appropriate amount of water (such as 20% to 30%, for example) is added. Then, the resultant product thus obtained is formed into a shape, which is allowed to settle. After hardening, it is dried by the applied heating whose temperature is gradually rising up to and 200° C., starting with 50° C. This drying process continues for about 30 minutes under this rising temperature condition. After it has completely become dry, it is placed under the flames from the burning gases, and is baked for five to ten minutes under the varying temperatures starting with 200° C. up to 1,250° C. The resulting product may be used in the high-temperature structures or applications, where it will not break or fuse when the high temperature heating is applied. As it will be appreciated, the compositions thus obtained may alternatively be used for forming a thermally-resistant coating layer by spraying them onto the surface of a particular structure while they are softened by adding water.

Another object of the present invention is the provision of a coating material that may be used in the high-temperature metal structures or other applications where the metal or other base surfaces must be protected against the applied heating or corrosion. The coating layer formed on the metal surfaces by the coating material of the invention also provides an increased hardness for the metal surfaces. The coating material has an affinity to water, and becomes a slurry by adding water. This permits an easy coating on a metal surface or other bases.

In accordance with the present invention, the coating material may comprise a hardening composition that contains alunite, powdery sodium silicate and sodium fluosilicate, and a component or components selected from the ceramics group or metals group or combination of those components from both the groups as well as an adequate amount of water (such as 40% to 50%, for example) to be added to the above. For applications where metal surfaces are to be protected appropriately, this coating material is applied on the metal base, and is then dried for about 30 minutes at the temperature range of 50° C. and 200° C. which is gradually rising. Then, the coating layer thus dried is baked for a period of five to fifteen minutes by the burning gases. The final coating layer obtained through those steps provides the mechanical strength and thermal resistance. Specifically, it will not break or fuse at the high temperatures.

In one specific form of the coating material, the hardening composition may be made up of 40%–65% of alunite, 30%–40% of powdery sodium silicate, and more or less than 5% of sodium silicofluoride. the ceramics group may include any one or ones of silicon carbide, zirconia, graphite, sirasu, perlite, silicon nitride, and the like. The metal group may include any one or ones of manganese, chrome, iron, steel, and the like.

According to the present invention, one or several elements selected from the ceramics and/or metal groups may be added to the above hardening composition. The result thus obtained may be shaped by adding water. After it has become hard, it is dried and then baked. The product that has been obtained in this way provides the increased thermal resistance, and retains its mechanical strength against any changes in its surrounding conditions. Thus, it will not fuse or have its shape altered when it is exposed to the high temperature for an extended period of time.

As described above, the coating material according to the present invention provides a water affinity, which allows it to be admixed with water. In this way, a uniform admixture can be obtained easily. This admixture may be applied onto the metal or other bases by any suitable means, such as by paint brushing, rolling, and spraying, so that a thin coating layer can be formed on those bases. Then, this thin coating layer may be baked so that it can be bonded firmly to the bases. Thus, any drastic surrounding changes, such as those in the temperature of the applied heating or the application of any external force, will not cause it to be detached from the metal or other bases.

As it will be appreciated from the preceding description, the coating material may be obtained by combining the particular hardening composition as described with any ceramics element or elements or combination of any ceramics and metal elements, to provide its water affinity. Thus, it can accept water, which promotes the uniform mixing of the substances. The coating material which contains the added water may be applied onto metal or other surfaces. The coating layer thus formed can firmly bond to those surfaces.

The coating material and the water to be added may have different proportions, depending upon how the coating operation takes place, such as by using a trowel or roller or by spraying. For example, when the trowel or roller is used, 25 to 60 parts of water may be added for 100 parts of the coating material, and when the spraying is involved, 55 to 65 parts of water may be added for 100 parts of the coating material.

The table shown below demonstrates the results that were obtained by testing the effects of the present invention under the different conditions, some examples of which are shown are described in the rest of the specification.

In the table, SIT-C160 represents the specific results obtained by applying the coating composition of the invention onto the non-metallic bases such as wood, cement, or slate. SIT-C250 represents the results for organic synthetic resin bases that has a strong adhesiveness. SIT-C500 represents the results for the thermal resistant coating composition. CIT-C700 represents the results for the wear resistant coating composition.

| Test Items TNC No. | SIT-C160 | SIT-C250 | SIT-C500 | SIT-C700 |
|---|---|---|---|---|
| bonding resistance (kg/cm²) | 1.6–1.9 | 3.8–4.1 | 4.0–10.1 | 8.1–9.6 |
| water resistance | yes | yes | yes | yes |
| boiling resistance | yes | yes | yes | yes |
| chemical resistance | | | | |
| alkali resistance | | | | |
| saturated lime water | yes | yes | yes | yes |
| 5% caustic soda | yes | yes | yes | yes |
| acid resistance | | | | |
| 5% hydrochloric acid | yes | yes | yes | yes |
| 5% acetic acid | yes | yes | yes | yes |
| 5% sulfuric acid | yes | yes | yes | yes |
| 5% nitric acid | yes | yes | yes | yes |
| wear resistance (g) | base exposed after 200 times (3.9944) | 0.6685 | 0.8525 | 0.2866 |
| scratch strength (hardness) (g) | 100 | 200 | 200 | 200 |

Note: "yes" means that there is no problem for the appropriate test item.

It is known that the conventional coating composition does not agree with the surfaces of the metal bases in particular. Thus, the layer formed by the coating composition on those metal bases cannot firmly be bonded to the surfaces, and is thus easily detached from them if any external force is applied or its ambient temperature is rising above the specific value. According to the coating composition of the invention, however, the admixture can be obtained simply by adding water, and its coating can be applied on the metal bases. The layer thus formed can have more mechanical strength and heat resistance by going through the baking process. As it may be understood from the above description, the present invention provides advantages over the prior art coating composition in that the coating composition of the invention is agreeable with the metal bases, and its coating operation can proceed simply by adding water and by admixing them together. The coating can be applied to a small thickness, and the formed thin layer can have the bonding ability and heat resistance increased by the baking process.

Furthermore, the ceramics-based product provided by the present invention contains an admixture of a specific hardening composition and a specific ceramic composition as well as a specific quantity of water added to the admixture, and may be obtained by forming the admixture into a desired shape. The shaping can occur with the aid of the added water. After the shaping, it may be baked at the specific temperatures. Thus, the finished product can have the increased mechanical strength and heat resistance. That is, it will not break or fuse when it is exposed to the high temperature heating. The combination of those compositions may also be used as a coating material if the quantity of water to be added is increased. In this case, it may be sprayed onto an object, forming a coating layer. In either case, the present invention is advantageous over the prior art in terms of the workability and operability.

BRIEF DESCRIPTION OF DRAWINGS

Those and other objects, features, and advantages of the present invention will be become more apparent from the detailed description of several particular examples that follows by reference to the accompanying drawing, in which.

DETAILED DESCRIPTION OF PREFERRED EMBODIMENTS

The following description provides several particular examples of the embodiments of the present invention, which as it will be understood are not limitative but for which other variations are possible.

EXAMPLE I

A hardening composition is prepared, which may include 32.5% of alunite ($Al_2O_3$, $K_2O$, $SO_3$, $Na_2O$, Fe), 17.5% of powdery sodium silicate ($Na_2O$, M.R, $Na_2O$), and 5% of sodium fluosilicate. An alumina composition which may include $Al_2O_3$, $Na_2O$, $SiO_2$, and $Fe_2O_3$ is prepared. Then, 45% of the alumina composition is added to 55% of the hardening composition, and the two compositions are admixed until a uniform admixture can be obtained. An amount of water which is equal to 27% of the total compositions is added to the admixture. The result thus obtained is then placed in a mold 1. A suitable pressure force, which should preferably be 10 kg/cm$^2$, for example, but may be varied depending upon the particular needs, is applied to a pressure plate 2, forming a shape 3. Then, the shape 3 is removed from the mold 1, and a flow of hot air is forced upon the shape 3 while the temperature of the hot air is gradually raised up to 200° C., starting with 50° C., for 30 minutes, during which it is dried. After it has been dried, the burning gas flames are forced upon it until it is heated up to 1,250° C., starting with 200° C. It is baked for 5 to 10 minutes in this condition, and a ceramics-based product is obtained.

Figure 1:
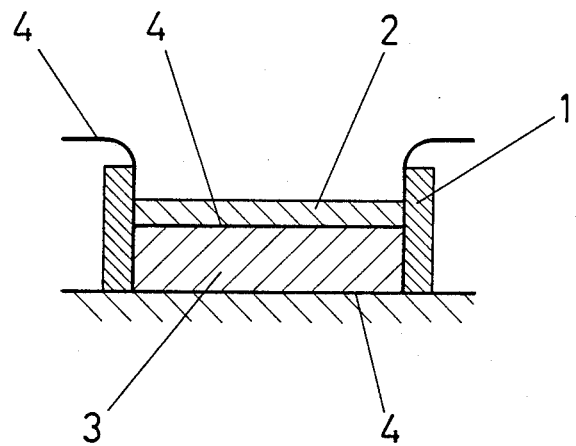
FIG. 1 illustrates a cross section of a ceramics-based material according to the present invention, as it is being formed into a shape.
Figure 2:
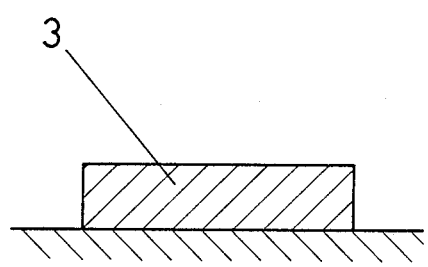
FIG. 2 illustrates a cross section of the shape obtained by FIG. 1.
Figure 3:
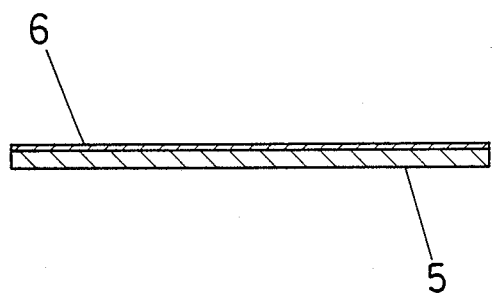
FIG. 3 illustrates one example of using a ceramics-based coating material according to the present invention, in which a formed coating layer is shown in cross section.
Figure 4:
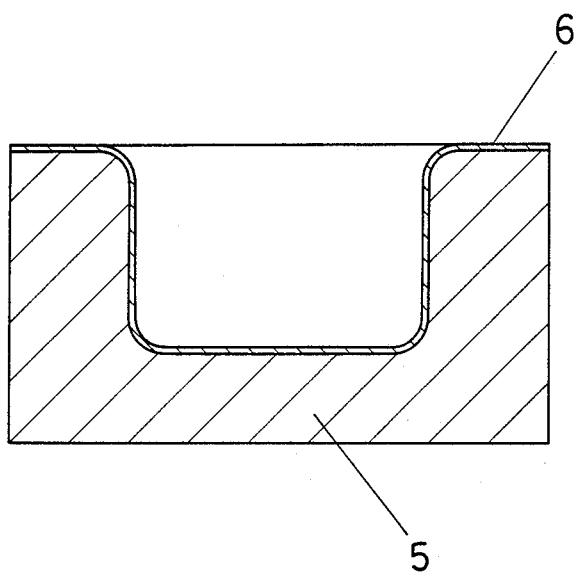
FIG. 4 illustrates another example of using a ceramics-based coating material according to the present invention, in which a formed coating layer is shown in cross section.

In FIG. 1, a lining of a teflon sheet 4 is provided inside the mold 1 and on the underside of the pressure plate 2. It is demonstrated that the product can retain its mechanical strength and heat resistance at the high temperature of 1,000° C.

EXAMPLE II

This example uses the same hardening composition as used in Example I. 40% of the alumina components as listed in the preceding example and 5% of graphite components (Ca, Si, Fe, Cu, Mg) are added to 55% of the hardening composition. Then, the quantity of water that is equal to 30% of the total compositions is added. They are mixed together until a uniform admixture is obtained, at which time the uniform admixture is placed in the mold. It goes through the drying and baking processes as described in the preceding example. The final product is a plate. It can retain its mechanical strength and heat resistance at the high temperature of 1,500° C.

EXAMPLE III

The same hardening composition as in EXAMPLE I is used. 35% of silicon carbide and 10% of graphite are added to 55% of the hardening composition. Water (27% of the total compositions) is added, and the mixing occurs until a uniform mixture is reached. Then, the same operation as in the example I follows, shaping a plate product.

This product can retain its mechanical strength and heat resistance at the higher temperature of 3,000° C. As noted, it may perform well in the extremely high temperature applications.

EXAMPLE IV

This example is provided for a coating material that is prepared for forming a coating layer on the surface of a metal mold or for forming a thermally resisting covering for a thermometer protective casing located inside a furnace.

A hardening composition is prepared, which may consist of 55% of alunite, 40% of powdery sodium silicate, and 5% of sodium fluosilicate. Then, 5% of chrome, 28% of silicon carbide, and 7% of zirconia are added to the hardening composition (60%). Those are mixed together by stirring in a mixing vessel until a uniform mixture can be obtained, the mixture providing a heat-resistant coating material that can be applied on the surfaces of the metal molds, etc. Prior to the actual coating operation, 40% to 50% of water is added to the above coating material, and both are mixed together until a uniform slurry can be obtained. This slurry is then applied to a thickness of 0.4 mm on the surface of the metal mold 5, by means of a paint brush. Thus, a 0.4 mm thick coating layer is formed. A flow of 90° C. hot air is forced on the metal mold 5, which continues for 30 minutes for drying it. Following this, a heater is operated to raise the temperature of the hot air gradually during 15 minutes, starting with 50° C. until it has reached 200° C. The drying takes place for 30 minutes at this raised temperature, at the end of which the temperature is again raised to 1,000° C., starting with 200° C., and the drying occurs for 10 minutes. Then, it is allowed to cure for one week. The coating layer processed through the above steps provides a coating layer 6 that can resist the high temperatures. That is, it cannot be destroyed or fuse under such high temperature environment. Then, its surface is polished to a final finish so that it can provide a mirror surface layer of 0.2 mm thickness. This layer 6, which is usually formed to a thickness of between 0.5 mm and 0.2 mm, for example, provides the increased heat resistance, and can resist the high temperature usage for an extended period of time. It should be noted that it can also resist any corrosion that may occur under the high-temperature burning gases, which would otherwise attack and erode the coating surface.

EXAMPLE V

This example is provided for a thermal insulating coating material.

A hardening composition may consist of 60% of alunite, 35% of powdery sodium silicate, and 5% of sodium fluosilicate. 33% of silicon carbide and 7% of zirconia are added to the hardening composition (60%). They are mixed together by stirring in a mixing vessel until a uniform mixture can be obtained. Thus, the insulating coating material results.

45% of water is added to the above coating material, and the two are mixed together to form a slurry. This slurry coating material is applied on an iron plate 5 from which surface any foreign matter, such as dusts, dirty solids, oils, and rusts, has previously been removed by cleaning. The coating layer is formed to a thickness of 0.3 mm, and the iron plate 5 is then placed in a drying oven or furnace. Within the oven, the iron plate 5 is dried for 30 minutes at the temperature which is gradually rising to 200° C., starting with 50° C. Following this, the burning gases are forced upon it, heating it up to between 980° C. and 1,250° C. for five minutes, followed by baking it at the constant temperature for 10 minutes. The resulting layer provides a better insulation, which therefore may particularly be useful for electrical applications, such as power distribution boards and electrical appliances.

In addition to the applications for the coating materials as described above in the examples, other possible applications may include those for base materials such as concrete (or cement), slate, metal plate and metal net, iron, stainless, aluminum, glass, wood, paper and cloth. For the application where the coating material is used for any synthetic resin base, a suitable intermediate layer should be provided on the base prior to forming a layer by the coating material of the invention.

Although the present invention has been fully described with reference to the several specific examples thereof, it should be understood that various changes and modifications may be made without departing from the spirit and scope of the invention.

What is claimed is:

1. A ceramic-based article having heat resistance, which is produced by a process comprising:
   a. admixing a hardening material comprising alunite, powdery sodium silicate and sodium fluosilicate, a material for providing heat resistance comprising at least one of ceramics and metals and water,
   b. shaping the resulting admixture,
   c. allowing said admixture to settle,
   d. drying said admixture and then
   e. baking.

2. The ceramic-based article as claimed in claim 1 wherein said ceramic material for providing heat resistance comprises at least one of alumina, sericite, clay, sirasu, perlite, silicon carbide, zirconia and silicon nitride and said metal material for providing heat resistance comprises at least one of copper, magnesium, titanium and nickel.

3. The ceramic-based article as claimed in claim 1 wherein said ceramic material is in the form of fibers.

4. The ceramic-based article as claimed in claim 3 wherein said ceramic material comprises boron fibers.

5. The ceramic-based article as claimed in claim 1 wherein the ceramic material is in the form of silicon carbide whiskers.

6. The ceramic-based material as claimed in claim 1 wherein said metals are in the form of metallic fibers.

7. The ceramic-based article as claimed in claim 1 wherein said hardening material is composed of 40 to 70% of alunite, 30 to 40% of powdery sodium silicate and about 10% of sodium fluosilicate.

8. The ceramic-based article as claimed in claim 1 containing said hardening material and the remaining materials in the ratio of 40 to 60% to 60 to 40%, respectively.

9. A coating material having heat resistance and water affinity, which comprises:
   a hardening material comprising alunite, powdery sodium silicate and sodium silicofluoride and
   a heat resistant material comprising at least one of ceramics and metals.

10. The coating material as claimed in claim 9 wherein said ceramic material for providing heat resistance comprises at least one of silicon carbide, zirconia, sirasu, perlite and silicon nitride.

11. The coating material as claimed in claim 9 wherein said metal material for providing heat resistance comprises at least one of manganese, iron and steel.

12. The coating material as claimed in claim 9 wherein said metals for providing heat resistance are in the form of metallic fibers.

13. The coating material as claimed in claim 9 wherein said hardening material contains 40 to 65% of alunite, 30 to 40% of powdery sodium silicate and about 5% of sodium fluosilicate.

14. The coating material as claimed in claim 9, containing said hardening material and the remaining materials in a ratio of 40 to 60% to 60 to 40%, respectively.

15. A ceramic-based article having heat resistance, which is produced by a process comprising:
   a. admixing a hardening material comprising alunite, powdery sodium silicate and sodium fluorosilicate, a material for providing heat resistance comprising alumina graphite or silicon carbide, and water,
   b. shaping the resulting admixture,
   c. allowing said admixture to settle,
   d. drying said admixture and then
   e. baking.

16. The ceramic-based article as claimed in claim 15 containing said hardening material and the remaining materials in the ratio of 40 to 60% to 60 to 40%, respectively.

17. The ceramic-based article as claimed in claim 16 wherein the remaining materials include a combination of 35 to 40% of alumina and 5 to 10% of graphite or a combination of 35 to 40% of silicon carbide and 10% of graphite.

18. The ceramic-based article according to claim 15 wherein the baking temperature is between 980° C. and 1250° C.

* * * * *